(12) United States Patent
Tripathy et al.

(10) Patent No.: US 7,374,177 B2
(45) Date of Patent: May 20, 2008

(54) ENHANCED MULTILAYER METAL GASKET

(75) Inventors: Bhawani Tripathy, Ann Arbor, MI (US); Daniel J. Vialard, Novi, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 11/231,179

(22) Filed: Sep. 20, 2005

(65) Prior Publication Data
US 2006/0119050 A1 Jun. 8, 2006

Related U.S. Application Data

(60) Provisional application No. 60/611,786, filed on Sep. 21, 2004.

(51) Int. Cl.
*F02F 11/00* (2006.01)
(52) U.S. Cl. ........................... 277/593; 277/598
(58) Field of Classification Search ................ 277/591, 277/593, 598
See application file for complete search history.

(56) References Cited

U.S. PATENT DOCUMENTS

| 4,796,897 | A | 1/1989 | Inciong |
| 5,341,779 | A | 8/1994 | Chen et al. |
| 5,522,604 | A | 6/1996 | Weiss et al. |
| 5,879,012 | A | 3/1999 | Udagawa |
| 6,186,513 | B1 | 2/2001 | Udagawa |
| 6,209,883 | B1 * | 4/2001 | Kashmerick et al. ........ 277/593 |
| 6,250,645 | B1 | 6/2001 | Udagawa |
| 6,257,591 | B1 * | 7/2001 | Abe et al. .................... 277/591 |
| 6,279,916 | B1 | 8/2001 | Stecher |
| 6,450,504 | B2 | 9/2002 | Bleidt et al. |
| 6,565,098 | B2 | 5/2003 | Bleyh |
| 6,712,364 | B2 | 3/2004 | Unseld et al. |
| 7,017,918 | B2 * | 3/2006 | Barclay et al. ............. 277/593 |
| 2003/0062692 | A1 | 4/2003 | Diez et al |

FOREIGN PATENT DOCUMENTS

| JP | 62-181756 | 11/1987 |
| JP | 4-44456 | 4/1992 |
| JP | 5-44845 | 2/1993 |

* cited by examiner

*Primary Examiner*—Vishal Patel
(74) *Attorney, Agent, or Firm*—Dickinson Wright PLLC; Robert L. Stearns

(57) ABSTRACT

A multilayer metal gasket, such as a multilayer steel head gasket, for an internal combustion engine has upper and lower functional layers and at least one intermediate layer. At least one of these layers has a circumferential compression control feature in the form of a protrusion or groove which varies in thickness or depth, respectively, around its circumference. The variable thickness of the compression control feature enables uniform sealing pressure on the sealing surfaces of the gasket.

12 Claims, 4 Drawing Sheets

ENHANCED MULTILAYER METAL GASKET

This application claims priority to U.S. Provisional Application No. 60/611,786, filed Sep. 21, 2004.

BACKGROUND OF THE INVENTION

1. Technical Field

The present invention relates generally to multilayer metal gaskets. The invention relates more particularly to multilayer metal gaskets having a compression limiting feature. Even more particularly, the invention relates to a multilayer metal gasket having a compression limiting feature which varies along the length of a selected sealing surface of the gasket.

2. Related Art

Two common issues exist with multilayer metal gaskets, such as multilayer steel cylinder head gaskets, they relate to the fatigue resistance of the gaskets and joint distortion associated with the use of the gaskets. Multilayer metal gaskets are made from thin sheets of metal, such as steel. In many applications, such as cylinder head gasket applications, these multilayer metal gaskets are subjected to temperature and pressure extremes associated with the operation of the internal combustion engine and the environmental conditions under which it is utilized. Thus, as the engine is operated, the internal combustion processes subject the cylinder head gasket to repeated pressure-induced cyclic motion and stresses and extreme temperatures. Over the operating life of an engine, this cyclical motion and stresses at the extreme operating temperatures can cause fatigue within the metal gasket, particularly fatigue in the region of the embossments which are used to provide the sealing surfaces of the gasket. While a cylinder head gasket is used as an example, other applications of multilayer metal gaskets are also subject to cyclic temperatures associated with their operating environment, and are thus also subject to the fatigue processes described above.

In the case of multilayer metal gaskets used in cylinder head gasket applications, this motion within the cylinder head gasket is known to play a significant role in cylinder bore distortion as the cylinder head gasket is the interface between the cylinder bore located within the engine block and the cylinder head. In operation, the cyclic changes described above also result in distortion of the cylinder bore in the region of the gasket. Cylinder bore distortion can cause high rates of wear on the piston rings or combustion gas blow-by within the head gasket.

One of the primary factors effecting fatigue and cylinder joint distortion is the fact that the common practice of applying a uniform bolt sealing pressure to the cylinder head bolts produces a non-uniform sealing force along the length of the sealing surfaces of the cylinder head gasket. Therefore, at various points along the circumference or length of the sealing surface associated with the cylinder bore opening, there exists a variation in the sealing force applied to and by the gasket. As the gasket is subjected to cyclic temperature variations, this can result in a tendency for fatigue failures at locations within the gasket where the sealing forces are highest.

Therefore, it is desirable to reduce the sealing force peaks along the gasket sealing surface, particularly to levels which are below a threshold associated with fatigue processes within a particular gasket design, so as to improve the fatigue performance of the gasket and reduce joint distortion associated with the gasket.

It is, therefore, desirable to improve the fatigue and joint distortion performance of multilayer metal gaskets. Further, it is desirable to make such improvements by controlling the sealing force along the length of the sealing surface of these gaskets for a particular engine block and cylinder head design, including the bolt pattern, particularly so as to make the sealing force more uniform along the length of the sealing surface.

SUMMARY OF THE INVENTION

The present invention is a multilayer metal gasket having improved fatigue and joint distortion performance. The present invention is particularly suited for use in cylinder head gasket applications for internal combustion engines. The present invention permits the control of the uniformity and magnitude of the sealing force along the length of the sealing surface of multilayer metal gaskets, such as for multilayer steel cylinder head gaskets for particular engine block and cylinder head designs, including the bolt pattern, particularly so as to make the sealing force more uniform along the length of the sealing surface and of a magnitude which does not promote the fatigue of the functional layers of the gasket.

The present invention is a multilayer metal gasket, including an upper metal layer having at least one upper opening formed therein and a downwardly extending upper sealing feature surrounding the upper opening formed in the upper metal layer, the upper sealing feature having an upper sealing surface thereon. The invention also includes a lower metal layer having a lower opening which corresponds to the upper opening and an upwardly extending lower sealing feature formed in the lower metal layer, the lower sealing feature having a lower sealing surface thereon. The invention also includes at least one intermediate metal layer located between the upper metal layer and the lower metal layer; wherein at least one of the upper metal layer, lower metal layer and intermediate layer have a compression control feature having a length which surrounds the opening and proximate to the upper sealing surface and the lower sealing surface, the compression control feature also having a predetermined profile which varies as a function of position along its length.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
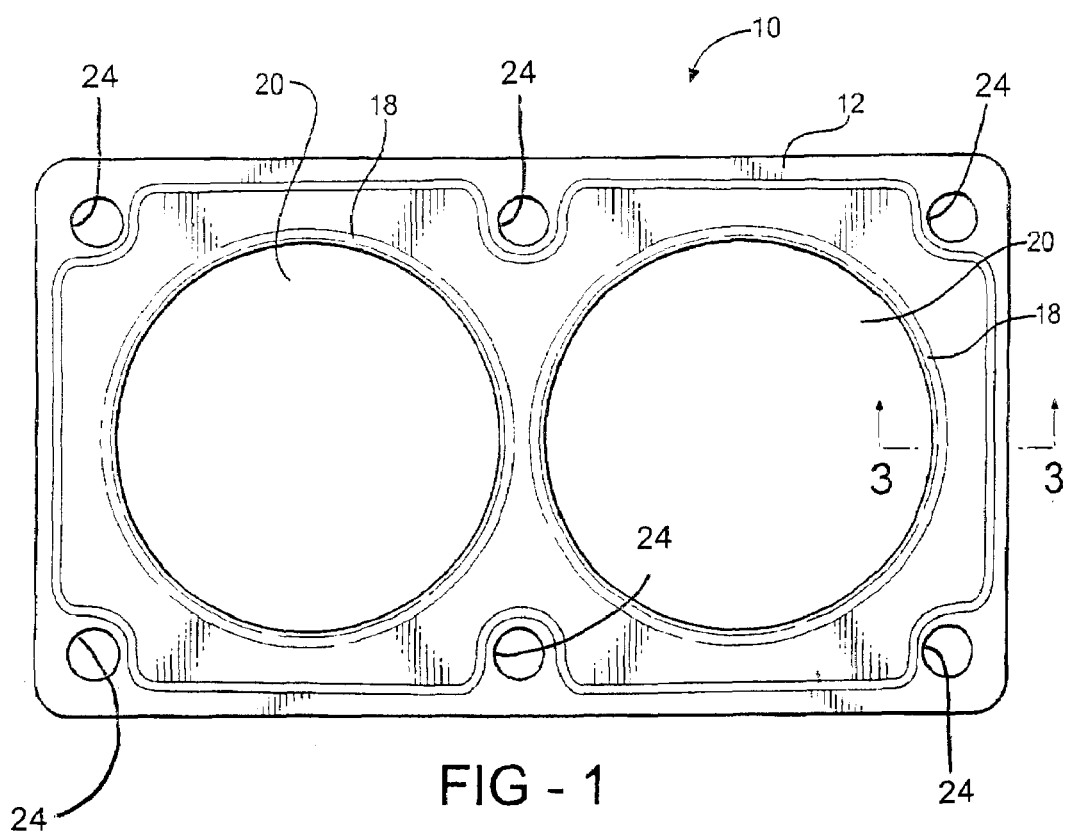
FIG. 1 is a top view of a multilayer metal gasket of the present invention.
Figure 2:
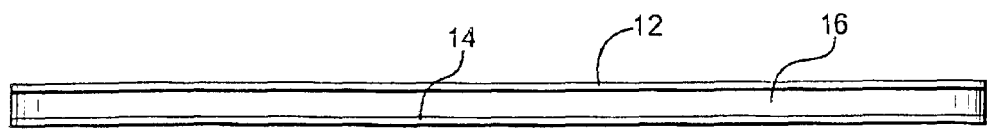
FIG. 2 is a side view of the gasket of FIG. 1.

FIG. 1 illustrates a multilayer metal gasket 10 of the present invention. Multilayer gasket 10 may be implemented in many different configurations and combinations of metal layers. Gasket 10 will include an upper functional layer 12 and a lower functional layer 14. Gasket 10 also includes at least one intermediate layer 16. Intermediate layer or layers 16 may include various combinations of stopper layers and/or distance or spacing layers, as illustrated in conjunction with various embodiments of the invention illustrated by FIGS. 3A-3J. A stopper layer is generally a thin layer that is used to affect the sealing force of a gasket in a particular region of the gasket proximate the gasket sealing surfaces. A stopper layer is typically used to limit the compression of the gasket particularly in the regions adjacent the sealing surfaces of the gasket. The stopper layer may comprise a contiguous layer that extends throughout the gasket, or alternately may comprise a discreet element, such as a sealing ring, or combinations thereof. One example of a discreet stopper layer element is a ring placed within the gasket adjacent to a combustion cylinder opening. Stopper layers may also be folded over upon themselves to increase their thickness in a particular region such as in a region adjacent to a combustion cylinder opening. A spacing or distance layer is a flat layer used to establish or adjust the overall compressed thickness of the gasket.

Upper functional layer 12 and lower functional layer 14 are the layers of the gasket that incorporate the sealing features, such as embossments 18, which are used to provide sealing around various gasket openings, such as combustion cylinder openings 20. The design and manufacture of such embossments in multilayer metal gaskets such as cylinder head gaskets, is well known.

Multilayer metal gasket 10 may be formed by multiple layers of any suitable metal. For cylinder head gasket applications, it is preferred that multilayer metal gasket 10 comprises layers of various compositions of steel. For cylinder head gasket applications, it is preferred that upper functional layer 12 and lower functional layer 14 comprise type 301 stainless steel. In such applications, where a stopper layer or ring is utilized, it is preferred that it comprise type 301 or type 304 stainless steel. Where a distance or spacing layer is utilized, it is preferred that it comprise a stainless steel or low carbon steel with a coating of a corrosion inhibiting metal, such as zinc, tin or aluminum, in order to enhance corrosion resistance.

In accordance with the invention, at least one of upper functional layer 12, lower functional layer 14 or at least one intermediate layer 16 have incorporated therein a circumferential compression control feature 22 that has a variable thickness along the length of the feature, or stated differently according to the circumferential position along the feature. The feature may be a circumferential compression control feature or a circumferential protrusion which has a depth or thickness, respectively, which varies according to the circumferential position. The thickness or depth of circumferential compression control feature 22 is provided so as to compensate for corresponding variations in sealing force expected for gasket 10 in view of the proximity of the embossments 18 to bolt openings 24, as illustrated in FIG. 3. Circumferential compression control feature 22 may also comprise the alteration of the thickness of a protruding feature, such as a ring. Therefore, as used herein, the alteration of the surface of a layer to produce a groove therein is treated synonymously with the alteration of a protruding feature to alter its thickness at various locations around its circumference or periphery. Further, while the term circumferential compression control feature 22 is utilized, it will be understood that where the sealing feature and associated sealing surface are not circular, that the invention described herein may be applied to such non-circular sealing surfaces also. FIGS. 3A-3J illustrate a number of embodiments of the invention which incorporate variable circumferential compression control feature 22 as described above. As may be seen by the illustrated embodiments, a circumferential feature 22 having thickness which varies around its circumference may be incorporated into any of the functional layers, stopper layers or spacing layers. These embodiments are explained in greater detail below.

Figure 3A:
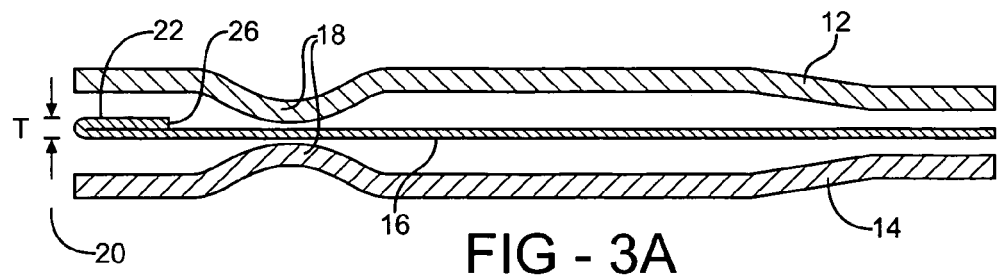
FIGS. 3A-3J are section views of various embodiments of the present invention taken along line 3-3 of FIG. 1.
Figure 4:
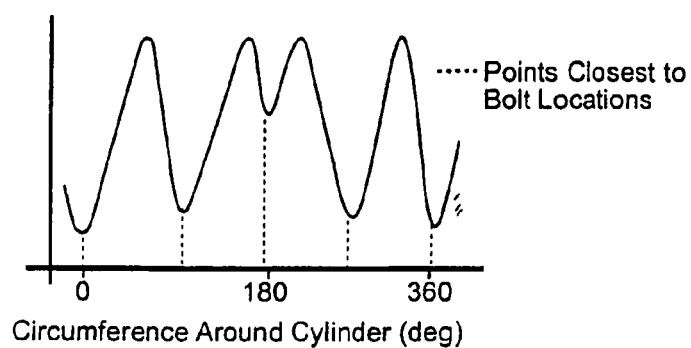
FIG. 4 is an exemplary plot of the variation in thickness of a circumferential compression control feature of the gasket as a function of circumferential position along the sealing surface.
Figure 3J:
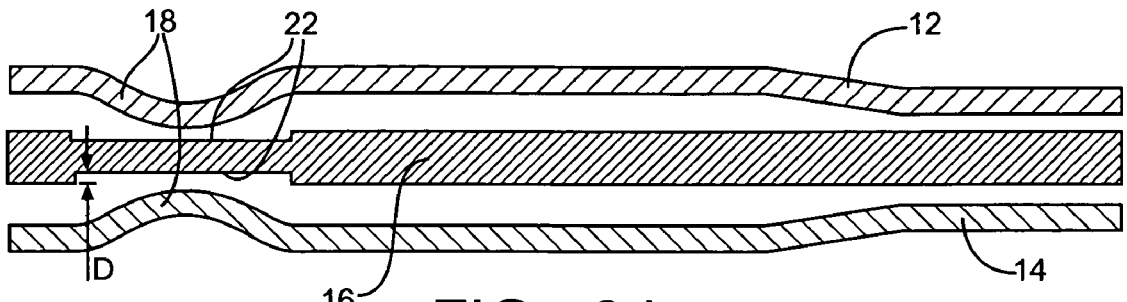

FIG. 3A is a multilayer metal gasket 10 of the invention which includes upper functional layer 12, lower functional layer 14 and intermediate layer 16 in the form of a stopper layer, wherein the stopper layer has a circumferential folded over portion 26. The upper functional layer 12 and the lower functional layer 14 each have circumferential embossments 18 proximate the combustion cylinder openings 20 which extend through gasket 10. Embossments 18 comprise elastic sealing beads that provide a circumferential sealing surface around combustion openings 20 when gasket 10 is compressed between the cylinder head and engine block (not shown) of an internal combustion engine. The circumferential compression control feature 22 comprises the folder-over portion 26 of the stopper layer. The thickness T of the folded over portion varies around its circumference. The thickness will preferably be varied so as to make the sealing pressure applied by the sealing beads 18 uniform along the length (circumference) of their sealing surface. Generally, in order to make the sealing pressure more uniform, the thickness T will be less in the portions of the folded-over portion closest to bolt openings 24 and greater in the portions of the folded-over portion 26 farthest away from bolt openings 24, as illustrated in FIG. 4. As gasket 10 is compressed, folded-over portion 26 of the stopper layer limits the compression of the gasket 10, particularly the compression of circumferential sealing beads 18. The intermediate layer and folded-over portion may be placed as illustrated, or the stopper layer may be placed (with suitable adjustment of the thickness T) with the folded-over portion reversed and facing downwardly.

Figure 3B:
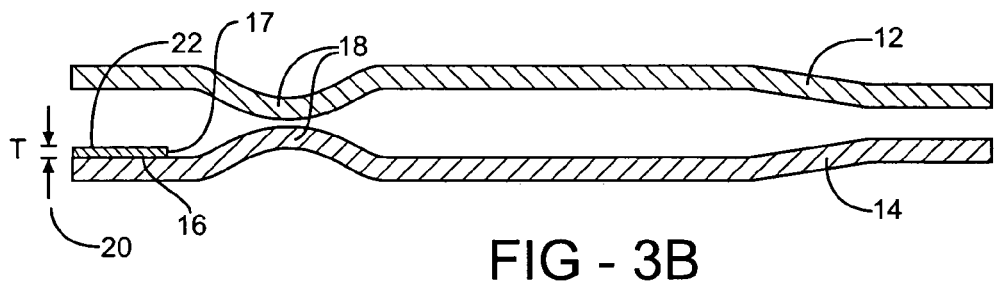

Similarly to FIG. 3A, FIG. 3B is a multilayer metal gasket 10 of the invention which includes upper functional layer 12, lower functional layer 14 and intermediate layer 16 in the form of a stopper layer, wherein the stopper layer comprises a circumferential stopper ring. The upper functional layer 12 and the lower functional layer 14 each have circumferential embossments 18 proximate the combustion cylinder openings 20 which extend through gasket 10. The stopper ring is located between the combustion cylinder opening 20 and the circumferential sealing beads 18. The stopper ring is preferably attached to a first surface of the upper functional layer, such as by welding or the use of a high temperature adhesive. The thickness T of the stopper ring varies around its circumference. The thickness will preferably be varied so as to make the sealing pressure applied by the sealing beads 18 uniform along the length (circumference) of their sealing surfaces. Generally, in order to make the sealing pressures more uniform, the thickness T will be less in the portions of stopper ring 17 closest to bolt openings 24 and greater in the portions of the stopper ring 17 farthest away from bolt openings 24, as illustrated in FIG. 4. As gasket 10 is compressed, stopper ring 17 limits the compression of gasket 10, particularly the compression of circumferential sealing beads 18. In this embodiment, the stopper ring does not extend under the sealing beads 18 so as to be in touching contact with the sealing surfaces thereof when gasket 10 is compressed.

Figure 3C:
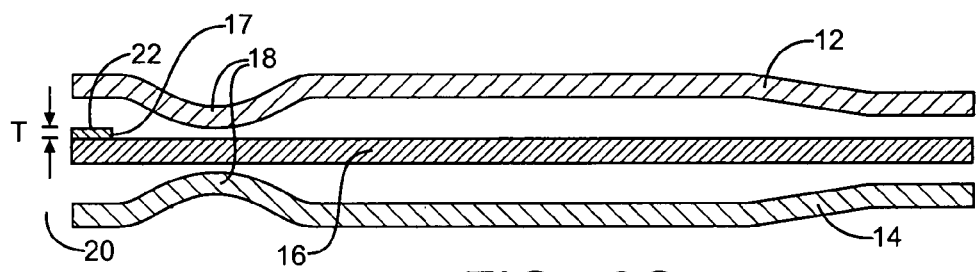

Similarly to FIG. 3A, FIG. 3C is a multilayer metal gasket 10 of the invention which includes upper functional layer 12, lower functional layer 14 and intermediate layer 16 in the form of a spacing layer, wherein the spacing layer also incorporates a circumferential stopper ring 17 located between the combustion cylinder opening 20 and circumferential sealing beads 18. The upper functional layer 12 and the lower functional layer 14 each have circumferential embossments 18 proximate the combustion cylinder openings 20 which extend through gasket 10. The stopper ring is located between the combustion cylinder opening 20 and the circumferential sealing beads 18. Stopper ring 17 is preferably attached to a first surface of the spacing layer, such as by welding or the use of a high temperature adhesive. Alternately, the stopper ring may be attached to one of the lower surface of upper functional layer 12 or the upper surface of lower functional layer 14. The thickness T of stopper ring 17 varies around its circumference. The thickness will preferably be varied so as to make the sealing pressure applied by the sealing beads 18 uniform along the length (circumference) of their sealing surfaces. Generally, in order to make the sealing pressures more uniform, the thickness T will be less in the portions of stopper ring 17 closest to bolt openings 24 and greater in the portions of stopper ring 17 farthest away from bolt openings 24, as illustrated in FIG. 4. As gasket 10 is compressed, stopper ring 17 limits the compression of gasket 10, particularly the compression of circumferential sealing beads 18.

Figure 3D:
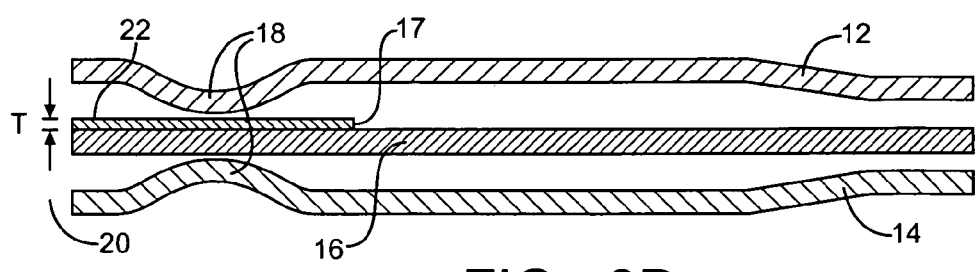

Similarly to FIG. 3C, FIG. 3D is a multilayer metal gasket 10 of the invention which includes upper functional layer 12, lower functional layer 14 and intermediate layer 16 in the form of a spacing layer, wherein the spacing layer also incorporates a circumferential stopper ring 17 which extends from the combustion cylinder opening under the sealing beads 18. The upper functional layer 12 and the lower functional layer 14 each have circumferential embossments 18 proximate the combustion cylinder openings 20 which extend through gasket 10. The stopper ring is located proximate to the combustion cylinder opening 20 and under circumferential sealing beads 18. Stopper ring 17 is preferably attached to a first surface of the spacing layer, such as by welding or the use of a high temperature adhesive. Alternately, stopper ring 17 may be attached to a second surface of the spacing layer opposite the first surface. The thickness T of stopper ring 17 varies around its circumference. The thickness will preferably be varied so as to make the sealing pressure applied by the sealing beads 18 uniform along the length (circumference) of their sealing surfaces. Generally, in order to make the sealing pressures more uniform, the thickness T will be less in the portions of stopper ring 17 closest to bolt openings 24 and greater in the portions of stopper ring 17 farthest away from bolt openings 24, as illustrated in FIG. 4. As gasket 10 is compressed, the stopper ring limits the compression of gasket 10, particularly the compression of circumferential sealing beads 18.

Figure 3E:
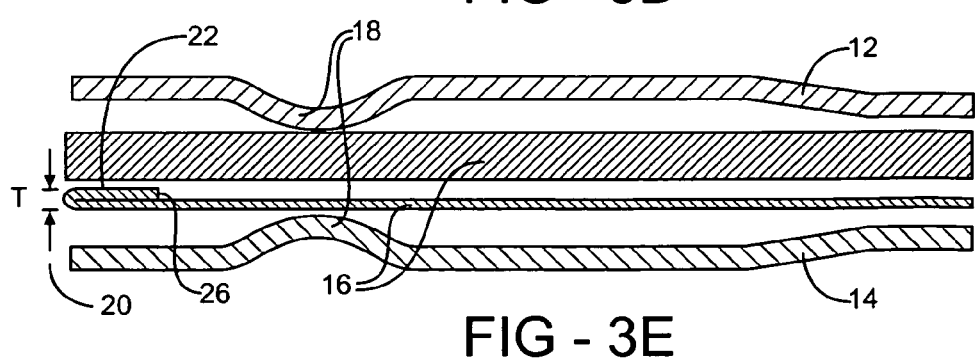

Similarly to FIG. 3A, FIG. 3E is a multilayer metal gasket 10 of the invention which includes upper functional layer 12, lower functional layer 14 and intermediate layer 16 in the form of a stopper layer and a separate spacing layer. The spacing layer is flat and the stopper layer has a circumferential folded over portion 26. The folded over portion is positioned such that it is located adjacent to the spacing layer. It will be understood that the positions of the stopper layer and spacing layer may be reversed, so long as the orientation of the folded-over portion 26 and spacing layer are maintained. The upper functional layer 12 and the lower functional layer 14 each have circumferential embossments 18 proximate the combustion cylinder openings 20 which extend through gasket 10. Embossments 18 comprise elastic sealing beads that provide a circumferential sealing surface around combustion openings 20 when gasket 10 is compressed between the cylinder head and engine block (not shown) of an internal combustion engine. The circumferential compression control feature 22 comprises the folder-over portion 26 of the stopper layer. The thickness T of the folded over portion varies around its circumference. The thickness will preferably be varied so as to make the sealing pressure applied by the sealing beads 18 uniform along the length (circumference) of their sealing surface. Generally, in order to make the sealing pressure more uniform, the thickness T will be less in the portions of the folded-over portion closest to bolt openings 24 and greater in the portions of the folded-over portion 26 farthest away from bolt openings 24, as illustrated in FIG. 4. As gasket 10 is compressed, folded-over portion 26 of the stopper layer limits the compression of the gasket 10, particularly the compression of circumferential sealing beads 18.

Figure 3F:
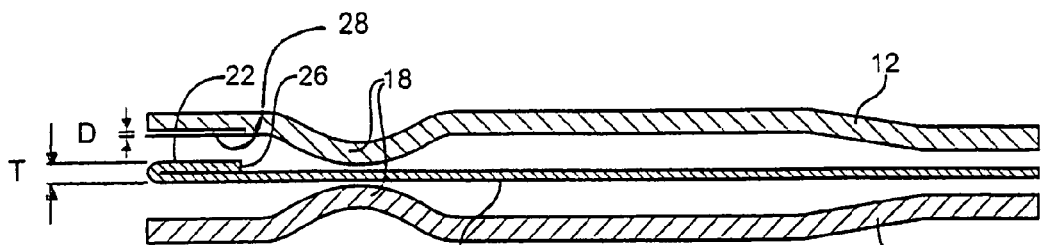
Figure 6:
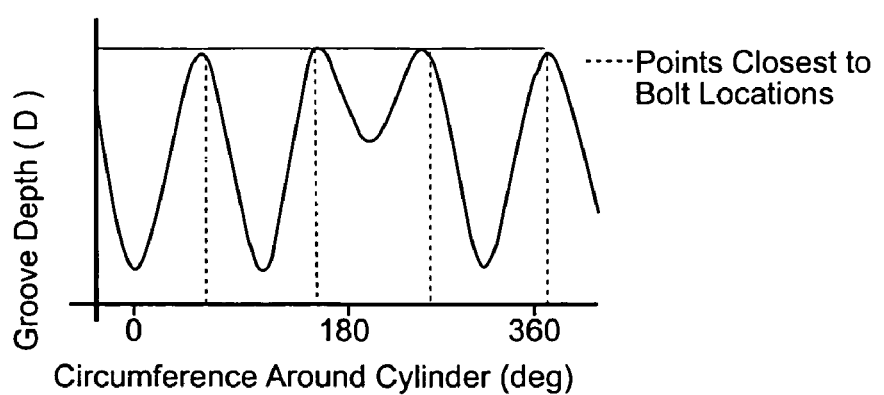
FIG. 6 is a plot of the depth of the circumferential compression control feature as a function circumferential position along the length of this feature of the embodiment illustrated in FIG. 3J.

Similar to FIG. 3A, FIG. 3F is a multilayer metal gasket 10 of the invention which includes upper functional layer 12, lower functional layer 14 and intermediate layer 16 in the form of a stopper layer, wherein the stopper layer has a circumferential folded over portion 26. The upper functional layer 12 and the lower functional layer 14 each have circumferential embossments 18 proximate the combustion cylinder openings 20 which extend through gasket 10. Embossments 18 comprise elastic sealing beads that provide a circumferential sealing surface around combustion openings 20 when gasket 10 is compressed between the cylinder head and engine block (not shown) of an internal combustion engine. The circumferential compression control feature 22 comprises a circumferential groove 28 in upper functional layer 12. The depth D circumferential groove 28 varies around its circumference. The depth will preferably be varied so as to make the sealing pressure applied by the sealing beads 18 uniform along the length (circumference) of their sealing surface. The profiled surface of circumferential groove 28 mates with the folder-over portion 26 of the stopper layer, and thus, the continuous circumferential groove 28 is opposite and radially aligned with the folded-over portion of the intermediate layer 16 such that the groove 28 is facing the folded-over portion of the intermediate layer 16. Generally, in order to make the sealing pressure more uniform, the thickness T or depth D will be greater in the portions of circumferential groove 28 closest to bolt openings 24 and less in the portions of circumferential groove 28 farthest away from bolt openings 24, as illustrated in FIG. 6. As gasket 10 is compressed, circumferential groove 28 and folded-over portion 26 of the stopper layer limit the compression of the gasket 10, particularly the compression of circumferential sealing beads 18. The intermediate layer and folded-over portion may be placed as illustrated, or the stopper layer may be placed (with suitable adjustment of the depth D with the folded-over portion reversed and facing downwardly and circumferential groove 28 formed in lower functional layer 14.

Figure 3G:
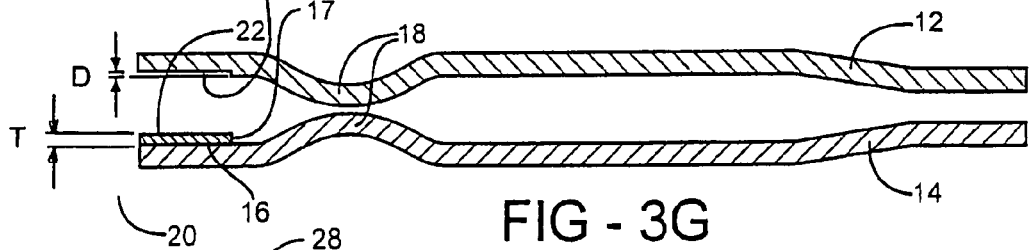

Similarly to FIG. 3B, FIG. 3G is a multilayer metal gasket 10 of the invention which includes upper functional layer 12, lower functional layer 14 and intermediate layer 16 in the form of a stopper layer, wherein the stopper layer comprises a circumferential stopper ring. The upper functional layer 12 and the lower functional layer 14 each have circumferential embossments 18 proximate the combustion cylinder openings 20 which extend through gasket 10. The stopper ring is located between the combustion cylinder opening 20 and the circumferential sealing beads 18. The stopper ring is preferably attached to a first surface of the upper functional layer, such as by welding or the use of a high temperature adhesive. The circumferential compression control feature 22 comprises a circumferential groove 28 in upper functional layer 12. The depth D of circumferential groove 28 varies around its circumference. The depth will preferably be varied so as to make the sealing pressure applied by the sealing beads 18 uniform along the length (circumference) of their sealing surface. The profiled surface of circumferential groove 28 mates with stopper ring 17 of the stopper layer. Generally, in order to make the sealing pressure more uniform, the depth D will be greater in the portions of circumferential groove 28 closest to bolt openings 24 and less in the portions of circumferential groove 28 farthest away from bolt openings 24, as illustrated in FIG. 6. As gasket 10 is compressed, circumferential groove 28 and stopper ring 17 of the stopper layer limit the compression of the gasket 10, particularly the compression of circumferential sealing beads 18. As gasket 10 is compressed, circumferential groove 28 and stopper ring 17 limit the compression of gasket 10, particularly the compression of circumferential sealing beads 18. In this embodiment, the stopper ring does not extend under the sealing beads 18 so as to be in touching contact with the sealing surfaces thereof when gasket 10 is compressed.

Figure 3H:
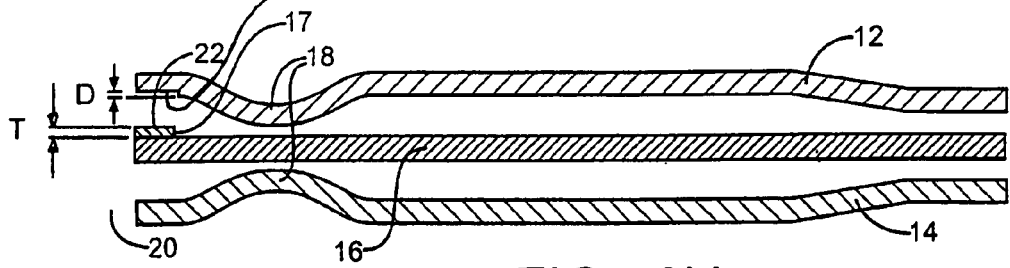

Similarly to FIG. 3C, FIG. 3H is a multilayer metal gasket 10 of the invention which includes upper functional layer 12, lower functional layer 14 and intermediate layer 16 in the form of a spacing layer, wherein the spacing layer also incorporates a circumferential stopper ring 17 located between the combustion cylinder opening 20 and circumferential sealing beads 18. The upper functional layer 12 and the lower functional layer 14 each have circumferential embossments 18 proximate the combustion cylinder openings 20 which extend through gasket 10. The stopper ring is located between the combustion cylinder opening 20 and the circumferential sealing beads 18. Stopper ring 17 is preferably attached to a first surface of the spacing layer, such as by welding or the use of a high temperature adhesive. Alternately, the stopper ring may be attached to one of the lower surface of upper functional layer 12 or the upper surface of lower functional layer 14. The circumferential compression limiting feature 22 comprises circumferential groove 28. The depth D of circumferential groove 28 varies around its circumference. The depth will preferably be varied so as to make the sealing pressure applied by the sealing beads 18 uniform along the length (circumference) of their sealing surface. The profiled surface of circumferential groove 28 mates with stopper ring 17 of the stopper layer. Generally, in order to make the sealing pressure more uniform, the depth D will be greater in the portions of circumferential groove 28 closest to bolt openings 24 and less in the portions of circumferential groove 28 farthest away from bolt openings 24, as illustrated in FIG. 6. As gasket 10 is compressed, circumferential groove 28 and stopper ring 17 limits the compression of gasket 10, particularly the compression of circumferential sealing beads 18.

Figure 3I:
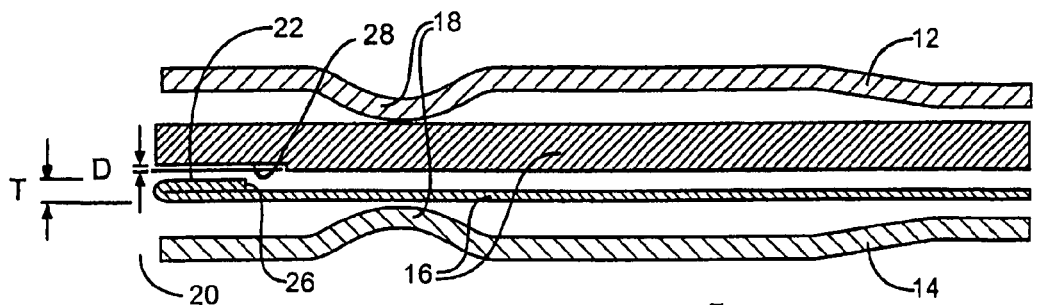

Similarly to FIG. 3E, FIG. 3I is a multilayer metal gasket 10 of the invention which includes upper functional layer 12, lower functional layer 14 and intermediate layer 16 in the form of a stopper layer and a separate spacing layer. The spacing layer is flat and the stopper layer has a circumferential folded over portion 26. The folded over portion is positioned such that it is located adjacent to the spacing layer. It will be understood that the positions of the stopper layer and spacing layer may be reversed, so long as the orientation of the folded-over portion 26 and spacing layer are maintained. The upper functional layer 12 and the lower functional layer 14 each have circumferential embossments 18 proximate the combustion cylinder openings 20 which extend through gasket 10. Embossments 18 comprise elastic sealing beads that provide a circumferential sealing surface around combustion openings 20 when gasket 10 is compressed between the cylinder head and engine block (not shown) of an internal combustion engine. The circumferential compression control feature 22 comprises the circumferential groove 28 of the stopper layer in upper functional layer 12. The depth D of the circumferential groove varies around its circumference. The depth will preferably be varied so as to make the sealing pressure applied by the sealing beads 18 uniform along the length (circumference) of their sealing surface. Generally, in order to make the sealing pressure more uniform, the depth D will be greater in the portions of the folded-over portion closest to bolt openings 24 and lesser in the portions of the folded-over portion 26 farthest away from bolt openings 24, as illustrated in FIG. 6. As gasket 10 is compressed, circumferential groove 28 and folded-over portion 26 of the stopper layer limit the compression of the gasket 10, particularly the compression of circumferential sealing beads 18.

FIG. 3I is a multilayer metal gasket 10 of the invention which includes upper functional layer 12, lower functional layer 14 and intermediate layer 16 in the form of a spacing layer. The spacing layer is generally flat. The upper functional layer 12 and the lower functional layer 14 each have circumferential embossments 18 proximate the combustion cylinder openings 20 which extend through gasket 10. Embossments 18 comprise elastic sealing beads that provide a circumferential sealing surface around combustion openings 20 when gasket 10 is compressed between the cylinder head and engine block (not shown) of an internal combustion engine. The circumferential compression control feature 22 comprises at least one circumferential groove 28 in the spacing layer. The circumferential groove 28 is formed under the sealing bead 18 of upper functional layer 12. It is preferable that the circumferential groove 28 comprises an upper and lower circumferential groove in the spacing layer, and even more preferable that the grooves have the same depth. The depth D of the circumferential compression control feature 22 varies around its circumference. The depth will preferably be varied so as to make the sealing pressure applied by the sealing beads 18 uniform along the length (circumference) of their sealing surface. Generally, in order to make the sealing pressure more uniform, the groove depth D will be greater in the portions of the folded-over portion closest to bolt openings 24 and lesser in the portions of the folded-over portion 26 farthest away from bolt openings 24, as illustrated in FIG. 6. As gasket 10 is compressed, circumferential groove 28 of the spacing layer limits the compression of the gasket 10, particularly the compression of circumferential sealing beads 18.

Figure 5:
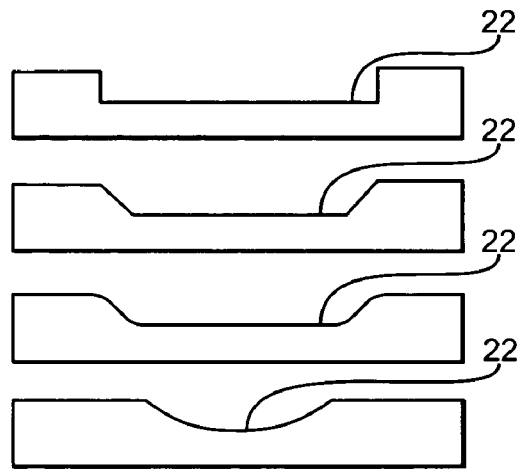
FIG. 5 is a schematic view of a plurality of circumferential compression control feature profiles which are applicable to the embodiment illustrated in FIG. 3J.

Referring to FIG. 5, a number of possible groove profiles of circumferential groove 28 are illustrated 30. These groove profiles are illustrative of those suitable for use in the embodiment of the invention illustrated in FIG. 3I.

The circumferential compression control feature 22 may be made by any suitable method of altering the thickness of stopper ring 17 or folded-over portion 26, or of forming the depth of circumferential groove 28, including any suitable methods of machining, grinding, or chemical or electrochemical etching.

While the illustrated embodiments have been described with respect to a circular or cylindrical opening 20 in gasket 10, it will be understood that opening 20 may be of any shape, and that the compression control feature 22 may also assume a shape such that it surrounds the opening 20, and that such an opening 20 may be described as having a length along the surrounding perimeter, and still further that the profile of compression control feature 22 may, according to this invention, be varied along the length of the feature.

Further, while the embodiments illustrated generally include two functional layers, it is believed that the circumferential compression control feature 22 may also be utilized in multilayer gasket designs of the types generally illustrated herein which have only one functional layer, such that circumferential compression control feature 22 is adapted to work either directly with only one functional layer, or alternately directly against a flange or component surface. In such designs, it is also believed that the compression control feature 22 as a groove or protrusion can be incorporated directly into a sealing surface of such a flange or component. This may be understood, for example, by the embodiments illustrated in FIGS. 3A, 3B, 3C, 3D and 3E modified so as to have functional layer 12 removed. This may be understood, for example, by the embodiments illustrated in FIGS. 3F, 3G, 3H and 3I modified so as to have functional layer 14 removed. And may be understood, for example, with respect to FIG. 3J modified such that circumferential compression control feature 22 is only on the lower surface of intermediate layer 16, and functional layer 12 is removed.

Still further, it will be understood that the invention may also be utilized in gasket designs which utilize more than two functional layers, as well as gasket designs which utilize more than one circumferential compression control feature 22 in a single multilayer gasket. For example, in the embodiments illustrated by FIGS. 3A-3J, by adding another functional layer or layers which has or which have, respectively, a sealing feature which seals on either or both of functional layers 12 or 14.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A multilayer metal gasket, comprising:
    an upper metal layer having at least one upper opening formed therein and a downwardly extending upper sealing feature surrounding the upper opening formed in said upper metal layer, the upper sealing feature having an upper sealing surface thereon;
    a lower metal layer having a lower opening which corresponds to the upper opening and an upwardly extending lower sealing feature formed in said lower metal layer, the lower sealing feature having a lower sealing surface thereon;
    at least one intermediate metal layer located between said upper metal layer and said lower metal layer, said intermediate layer having an annular portion with a constant thickness surrounding said upper and lower openings; wherein at least one of the upper metal layer or lower metal layer have a compression control feature having a length which completely surrounds the opening proximate to the upper sealing surface and the lower sealing surface opposite and radially aligned with said constant thickness annular portion of said intermediate metal layer, the compression control feature being formed as a groove extending circumferentially into said at least one upper metal layer or lower metal layer, said groove having a predetermined depth greater than zero which varies continuously about the entire circumference of the opening as a function of position along its length.

2. The gasket of claim 1, wherein the compression control feature is located on the upper metal layer.

3. The gasket of claim 1, wherein the compression control feature is located on the lower metal layer.

4. The gasket of claim 1, wherein the compression control feature is a groove formed in the lower metal layer, wherein the profile of the groove varies along its length.

5. The gasket of claim 1, wherein the intermediate layer comprises a flat spacing layer.

6. The gasket of claim 1, wherein the intermediate layer is a flat spacing layer having an upper surface and a lower surface.

7. The gasket of claim 1, wherein the compression control feature comprises a groove formed in at least one of the upper surface and the lower surface of the spacing layer between the upper sealing surface and the lower sealing surface.

8. The gasket of claim 1, wherein the compression control feature comprises a groove formed as an upper groove portion in the upper surface of the spacing layer and a lower groove portion formed in the lower surface of the spacing layer.

9. The gasket of claim 8, wherein the profile associated with the groove is split between the upper groove portion and the lower groove portion.

10. The gasket of claim 1, wherein the compression control feature comprises a groove formed in the upper metal layer.

11. The gasket of claim 2 wherein said annular portion of said intermediate metal layer having a constant thickness has a circumferentially extending folded over portion facing said groove in said upper metal layer.

12. The gasket of claim 10 wherein said annular portion of said intermediate metal layer having a constant thickness has a circumferentially extending folded over portion facing said groove in said upper metal layer.

\* \* \* \* \*